US009067596B2

(12) United States Patent
Okamoto (10) Patent No.: US 9,067,596 B2
(45) Date of Patent: Jun. 30, 2015

(54) CONTROL APPARATUS OF HYBRID VEHICLE (71) Applicant: DENSO CORPORATION, Kariya, Aichi (JP)

(72) Inventor: Tsuyoshi Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/228,804

(22) Filed: Mar. 28, 2014

(65) Prior Publication Data
US 2014/0297080 A1 Oct. 2, 2014

(30) Foreign Application Priority Data

Mar. 29, 2013 (JP) .................................. 2013-73879

(51) Int. Cl.
B60L 11/00 (2006.01)
B60W 10/00 (2006.01)
B60W 20/00 (2006.01)
B60W 10/06 (2006.01)
B60W 10/26 (2006.01)
B60W 10/30 (2006.01)

(52) U.S. Cl.
CPC ............. B60W 20/108 (2013.01); B60W 10/06 (2013.01); B60W 10/26 (2013.01); B60W 10/30 (2013.01); Y10S 903/93 (2013.01)

(58) Field of Classification Search
CPC ...................... B60W 20/00; B60W 2510/0638; B60W 2710/0666; B60W 2710/083; B60W 2510/244; B60W 20/102; B60W 2510/0657; B60W 2540/10; Y02T 10/6286; Y02T 10/52; Y02T 10/642; Y02T 10/7283; B60L 2240/423; B60L 2240/421; B60K 2006/262; F02D 2250/18; F02D 11/105; G01C 21/26; Y10S 903/906; G01L 23/145; G01L 23/223; H02K 51/00
USPC ............... 701/22, 123, 114, 24, 84; 180/65.1, 180/65.265, 65.4, 65.2; 903/930, 905
See application file for complete search history.

(56) References Cited

U.S. PATENT DOCUMENTS 5,789,882 A * 8/1998 Ibaraki et al. ................. 318/148
5,988,137 A * 11/1999 Tamura et al. ................ 123/295
6,018,694 A * 1/2000 Egami et al. .................. 701/102
2002/0113440 A1 8/2002 Kimura et al.
2009/0150016 A1 * 6/2009 Hung et al. ...................... 701/22

FOREIGN PATENT DOCUMENTS

JP 2004-360672 12/2004
JP 3812134 6/2006

* cited by examiner

Primary Examiner — Muhammad Shafi
(74) Attorney, Agent, or Firm — Nixon & Vanderhye PC (57) ABSTRACT A control apparatus of a hybrid vehicle has an engine, a motor, an engine-driven generator, and a battery. A controller determines an engine output based on an efficiency function that is defined by a drive power of the vehicle, a generated electric power from the generator, and a discharged electric power from the battery. The determined engine output controls the efficiency function to be kept in a value range that includes a maximum efficiency value of the efficiency function.

4 Claims, 6 Drawing Sheets

CONTROL APPARATUS OF HYBRID VEHICLE

CROSS REFERENCE TO RELATED APPLICATION

The present application is based on and claims the benefit of priority of Japanese Patent Application No. 2013-73879, filed on Mar. 29, 2013, the disclosure of which is incorporated herein by reference.

TECHNICAL FIELD

The present disclosure generally relates to a hybrid vehicle control apparatus which uses an engine and a motor generator as power sources.

BACKGROUND INFORMATION

In recent years, hybrid vehicles have drawn public attention due to a demand for low fuel consumption and low emission vehicles. Generally, hybrid vehicles utilize an internal combustion engine and a motor generator as power sources. In some hybrid vehicles, as disclosed in a patent document 1 (i.e., a Japanese Patent No. 3812134), the engine power is determined based on a drive power (i.e., a power requested for a travel of the vehicle) and a battery charge-discharge electric power so that a battery charge state is maintained within a certain preset range.

In a hybrid vehicle, a fuel consumption per mile is reduced by an EV drive that solely drives the hybrid vehicle via power from an electric motor without using the internal combustion engine, that is, by stopping the engine due to a low efficiency operation state of the engine at a low driving load. However, using the EV drive for too long lowers a battery State Of Charge (SOC), and the EV drive may have to be interrupted for the engine drive of the vehicle, which does not improve fuel mileage. Therefore, when the battery SOC lowers to a certain level, the battery is charged by using the engine power, that is, by generating electricity for the charging of the battery by the operation of the engine.

However, if the amount of electricity generation during a high driving load is set to a high level for a quick recovery of the battery SOC, for example, the high level setting of the electricity generation amount may lead to a deterioration of system efficiency. That is, an efficiency of a system as a whole, i.e., a hybrid vehicle as a system which includes the engine, the generator, the battery and the like, may be deteriorated by such setting at the high driving load, thereby preventing a sufficient improvement of the system efficiency and preventing the improvement the fuel mileage.

Further, in the hybrid vehicle, the amount of heat may be insufficient in winter, i.e., in a heating operation time in winter, due to a low-frequency operation of the engine. Such an insufficient heat amount situation may be quickly resolved by increasing the amount of the engine-generated electric power from the engine, which eventually increases the amount of heat from the engine. However, the amount of electric power generation may have to be carefully determined in consideration of the system efficiency, for the improvement of the fuel mileage.

Therefore, in a hybrid vehicle, in order to effectively improve the fuel mileage, the efficiency of the system, including the engine, the generator, the battery and the like, as a whole must first be improved. However, the technique in the above-described patent document 1 does not consider the system efficiency. That is, the technique in the patent document 1 simply determines an engine power for keeping the battery SOC in a certain range. Thus, it may be difficult for such technique to improve the system efficiency and to effectively improve the fuel mileage.

SUMMARY

It is an object of the present disclosure to provide a hybrid vehicle control apparatus that improves system efficiency while effectively improving the fuel mileage of the hybrid vehicle.

In an aspect of the present disclosure, a control apparatus of a hybrid vehicle has an engine and a motor serving as a power source of the vehicle, a generator driven by the engine, and a battery that is charged and discharged. The control apparatus includes a controller determining an engine output based on a system efficiency function that is defined by a drive power of the vehicle, a generated electric power from the generator, and a discharged electric power from the battery. The engine output determined by the controller controls the system efficiency function to have a maximum value or to stay within a preset value range that includes the maximum value.

By determining the engine output for the maximum value of the system efficiency function which is defined by the drive power, the generated electric power, and the discharged electric power or for allowing the function value to stay within a preset value range including the maximum, the engine is operated at or around an engine operation point where the system efficiency of the whole system including the engine, the generator, the battery and the like is maximized. Therefore, the system efficiency is improved while effectively improving the fuel mileage of the hybrid vehicle.

BRIEF DESCRIPTION OF THE DRAWINGS

Objects, features, and advantages of the present disclosure will become more apparent from the following detailed description made with reference to the accompanying drawings, in which.

DETAILED DESCRIPTION

One embodiment realizing the present disclosure is described in the following.

Figure 1:
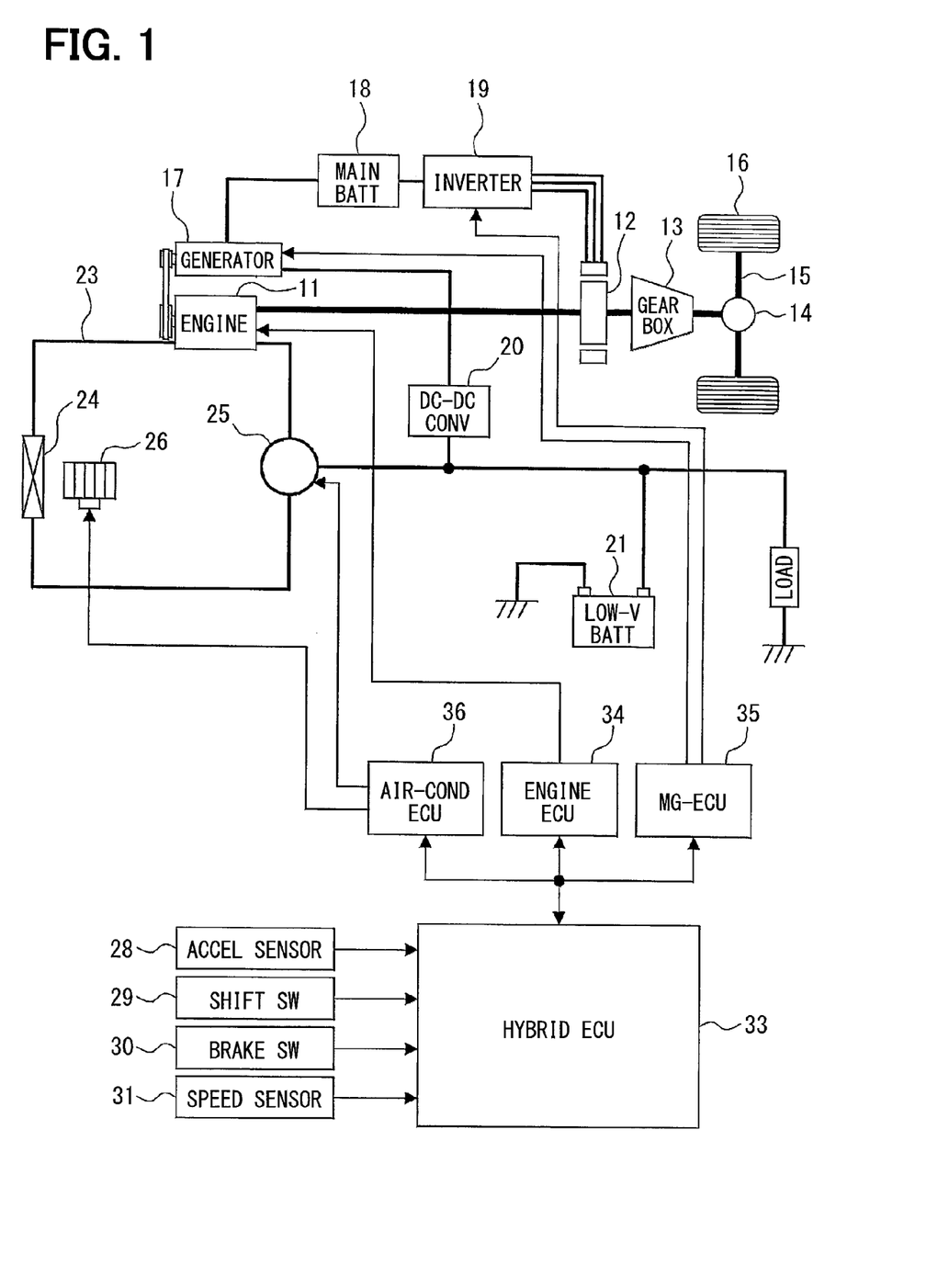
FIG. 1 is a block diagram of a control system of a hybrid vehicle in one embodiment of the present disclosure.

First, based on FIG. 1, an outline configuration of a control system of a hybrid vehicle is described.

A subject vehicle has an internal combustion engine 11 and a motor generator 12 (i.e., hereafter abbreviated to "MG 12")

installed therein as a power source of the vehicle. The power of an output shaft (i.e., a crankshaft) of the engine 11 is transmitted to a gearbox 13 via the MG 12, and the power of the output shaft of the gearbox 13 is transmitted to a wheel 16 via a differential gear mechanism 14, an axle 15, and other parts. The gearbox 13 may be a step-wise gearbox which chooses one of a plurality of gears respectively having discrete gear ratios, or may be a CVT (i.e., a continuously variable transmission) which continuously changes a gear ratio without having step-wise gear ratios.

In the middle of a power transmission path that transmits an engine power from the engine 11 to the wheel 16, at a position between the engine 11 and the gearbox 13, a rotation shaft of the MG 12 is connected in a power transmittable manner. On the power transmission path, a clutch (not illustrated) for interrupting and re-connecting such transmission may be installed at a position between the engine 11 and the MG 12, or at a position between the MG 12 and the gearbox 13.

A generated electric power from a generator 17 that is driven by a drive power of the engine 11 is charged to a main battery 18. An inverter 19 which drives the MG 12 is connected to the main battery 18, and the MG 12 delivers to and receives from the main battery 18 an electric power via the inverter 19. The generator 17 is connected to a low-voltage battery 21 via a DC-DC converter 20. Each of the main battery 18 and the low-voltage battery 21 is a battery that is chargeable and dischargeable (i.e., a battery that allows charging and discharging of the electric power).

A coolant passage (not shown) of the engine 11 is connected to a hot water circuit 23 that is used for a heating operation for heating air in a vehicle compartment, for example. The hot water circuit 23 has a heater core 24 for the heating operation and an electric water pump 25 installed therein. The electric water pump 25 is driven by the electric power of the low-voltage battery 21, and, by using this electric water pump 25, a coolant (i.e., a warm water) is circulated between the engine 11 and the heater core 24. Further, at a proximity of the heater core 24, a blower fan 26 for blowing a warm air is disposed.

An accelerator opening (i.e., an amount of operation of an accelerator) is detected by an accelerator sensor 28, and an operation position of a shift lever is detected by a shift switch 29. Further, a brake operation is detected by a brake switch 30 or an amount of the brake operation is detected by a brake sensor, and a vehicle speed is detected by a speed sensor 31.

A hybrid ECU 33 is a computer which integrally controls an entire vehicle in a unified manner, with which output signals from various kinds of sensors are read for detecting an operational state of the vehicle. The hybrid ECU 33 controls a signal exchange among an engine ECU 34 that regulates an operation of the engine 11, an MG-ECU 35 that regulates the inverter 19 for regulating the MG 12 and for regulating the generator 17, and an air-conditioner ECU 36 that regulates a heater (i.e., the electric water pump 25 and the blower fan 26), and thus, the engine 11, the MG 12, the generator 17, the heater (i.e., the electric water pump 25 and the blower fan 26), and the like are controlled by each of the ECUs 34-36 according to the operational state of the vehicle.

In the present embodiment, by the execution of an engine control routine of FIG. 2 by the hybrid ECU 33, which is described later, a system efficiency function is defined by the drive power of the vehicle, the generated electric power of the MG 12 and/or the generator 17, the discharged electric power of the main battery 18, and the amount of heat from the coolant of the engine 11, and, based on at least one of (i) a state of the main battery 18, (ii) outside air temperature, (iii) future driving information, or (iv) coolant temperature of the engine 11, at least one of requested energies is calculated, that is, at least one of (i) a requested energy for charging and discharging or (ii) a requested energy for heat storage is calculated. Then, while fulfilling a demand of such requested energies, the engine output is determined so that the system efficiency function is kept in a certain range including the maximum value of the function.

Figure 2:
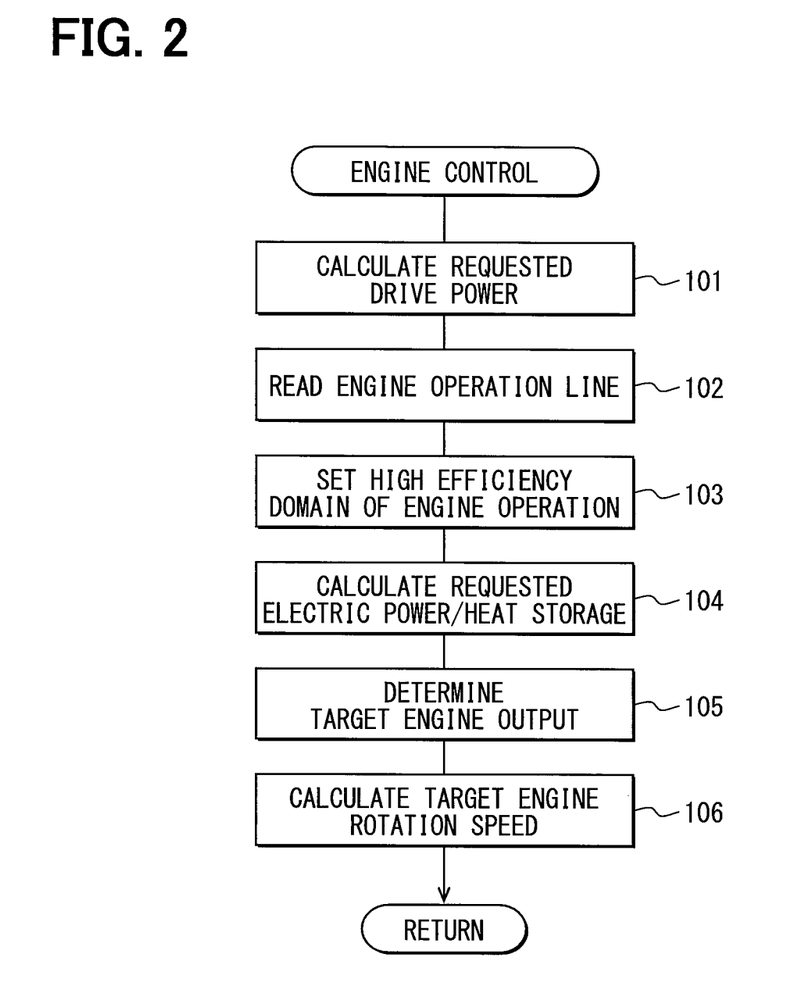
FIG. 2 is a flowchart of an engine control routine.

Hereafter, the contents of processing of the engine control routine of FIG. 2 which is executed by the hybrid ECU 33 are described.

The engine control routine shown in FIG. 2 serves as a controller in the claims, repeatedly executed at given intervals during a turn-ON period of the hybrid ECU 33. After a start of the routine, the requested drive power of the vehicle (i.e., a power requested for a travel of the vehicle) is calculated first by using a map or an equation in Step 101, based on an accelerator opening, a vehicle speed, a driving loss (e.g., a driving resistance, a gear loss), and the like.

Figure 3:
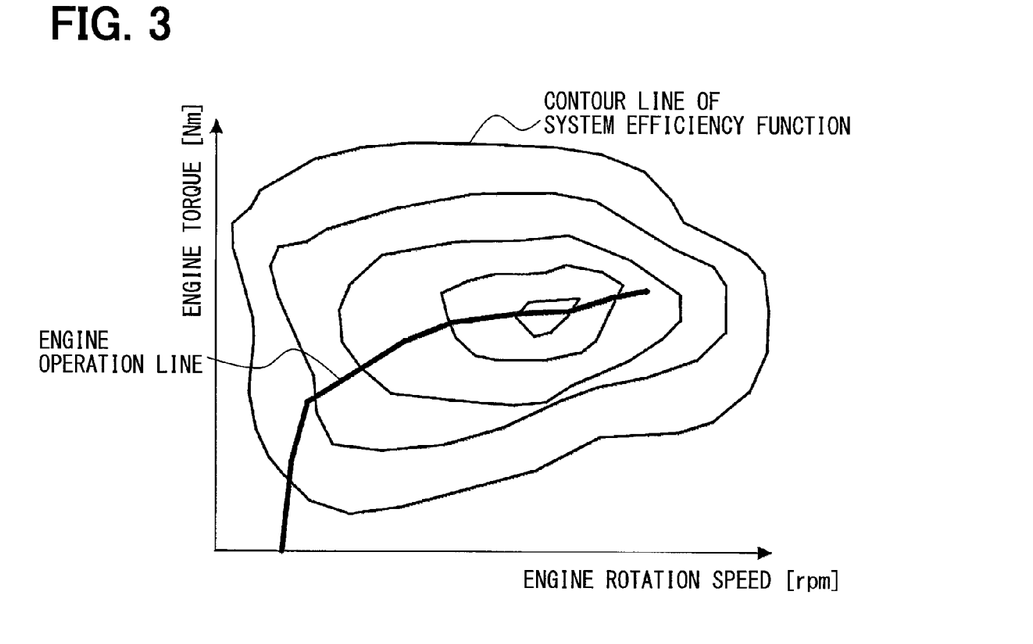
FIG. 3 is a diagram of an example of an engine operation line.

Then, the routine proceeds to Step 102, and the data of an engine operation line is read (see FIG. 3). The engine operation line is created in advance based on test data, design data, etc., and is memorized in a ROM of the hybrid ECU 33.

The engine operation line is created in the following manner. First, an equation (1) defining a system efficiency function is formulated by using the drive power of the vehicle, the generated electric power (G) from the MG 12 and/or the generator 17, the discharged electric power (D) from the battery 18, the amount of heat (H) used to heat the coolant of the engine 11, and the amount of heat (C) released/radiated from the coolant of the hot water circuit 23.

$$\text{System efficiency function}[-] = \frac{\text{Drive power}[kW] + \alpha[-] \cdot G[kW] + \gamma[-] \cdot H[kW]}{\text{Consumed fuel power}[kW] + \beta[-] \cdot D[kW] + \delta[-] \cdot C[kW]} \quad \text{(Equation 1)}$$

In the above, [—] indicates a dimensionless number.

In the system efficiency function, $\alpha$, $\beta$, $\delta$ are set to be equal to 0, and $\gamma$ is set to have an arbitrary value, for creating a contour line of the system efficiency function (see FIG. 3). Then, for each of the various engine outputs, an engine operation point that maximizes the system efficiency function (i.e., a combination of an engine rotation speed and an engine torque) is determined for drawing an engine operation line (see FIG. 3).

Then, the routine proceeds to Step 103, and, when a requested drive power is given (i.e., when the drive power is set to be equal to the requested amount), the system efficiency function is calculated by the above-mentioned Equation (1) on the engine operation line that is prepared in advance ($\alpha$, $\beta$, $\delta$, $\gamma$ are respectively set to have an arbitrary value). As a result, a proximity of the engine operation points where the system efficiency function takes the maximum value (i.e., a predetermined domain including the maximum value of the system efficiency function) is set as a high efficiency domain of the engine operation (see FIG. 4).

Figure 4:
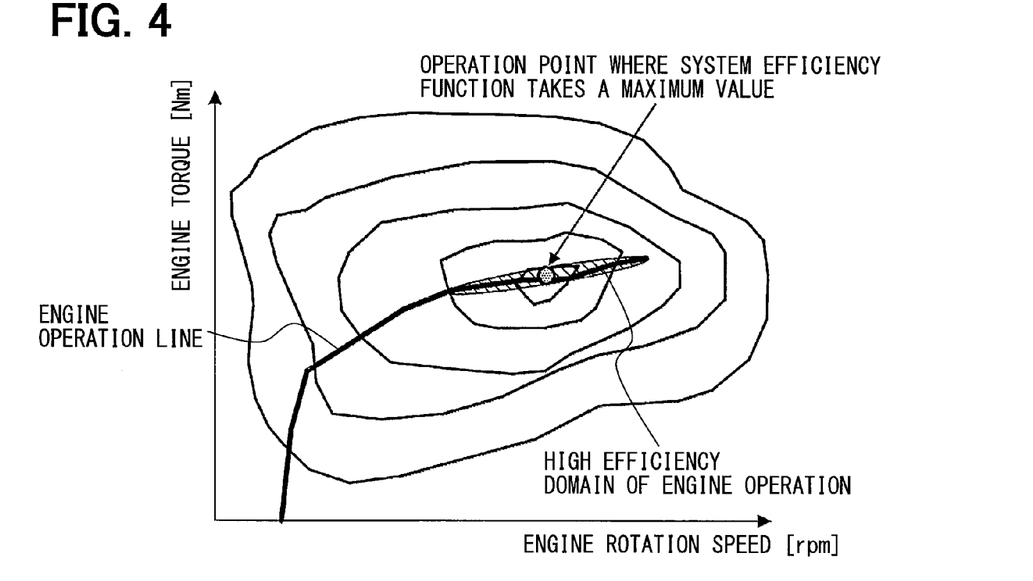
FIG. 4 is a diagram of an example of a high efficiency domain of an engine operation.

Here, the high efficiency domain of the engine operation is described in more detail.

Figure 5:
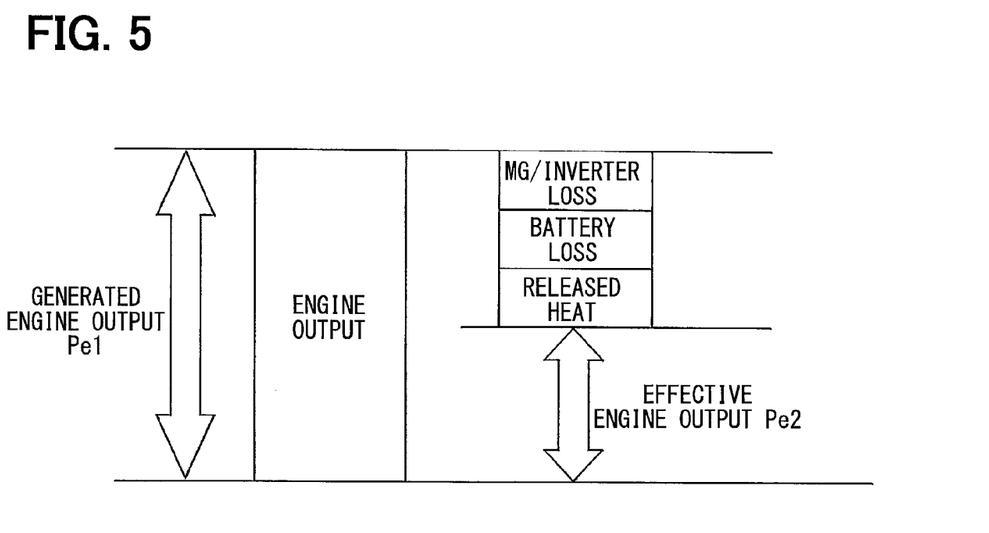
FIG. 5 is a diagram of relationship between a generated engine output and an effective engine output.

As for efficiency, there may be a generative efficiency derived from the generated engine output Pe1 (see FIG. 5) and an effective efficiency derived from an effective engine output Pe2 (see FIG. 5).

Generative efficiency [%]=Generated engine output Pe1 [kW]/Consumed fuel power [kW]×100

Effective efficiency [%]=Effective engine output Pe2 [kW]/Consumed fuel power [kW]×100

Figure 6:
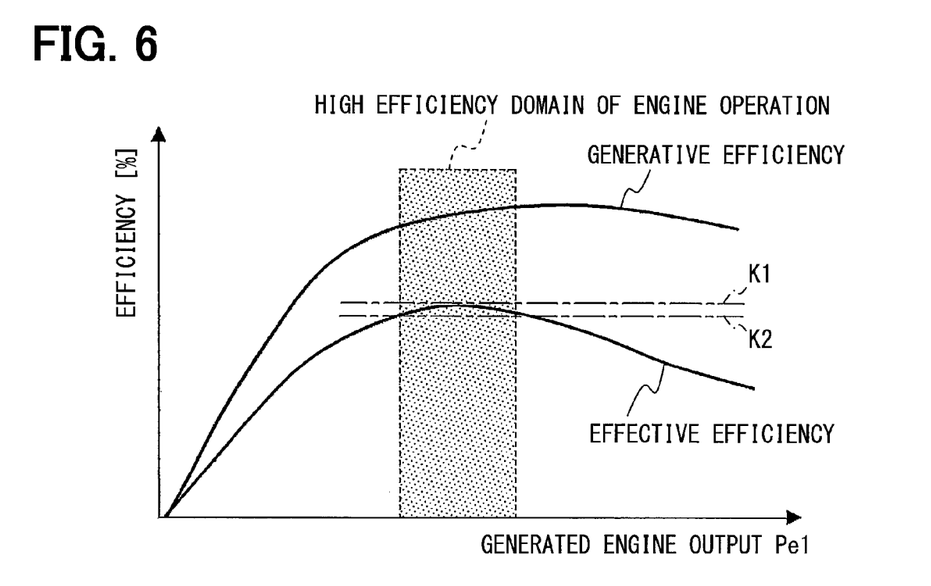
FIG. 6 is a diagram of how the high efficiency domain of the engine operation is set.

The system efficiency function considers the amount of loss (i.e., loss of the MG 12 or the inverter 19, loss of the battery 18, the amount of heat released, etc.), which means that the value of the system efficiency function is an effective efficiency that is derived from the effective engine output Pe2 (=the generated engine output Pe1−loss). Further, as shown in FIG. 6, the high efficiency domain of the engine operation is a value range of the effective efficiency (i.e., the system efficiency function), in which the value of the effective efficiency is equal to or greater than a value K2 that is set to be smaller than the maximum value K1 by a predetermined percentage value [%].

Then, the routine proceeds to Step 104, and the routine calculates requested energies, such as a requested electrical charge-discharge energy (i.e., one of a requested charge energy and a requested discharge energy), a requested heat storage energy and the like, based on at least one of the state of the main battery 18 (e.g., the battery SOC, the battery voltage, the battery temperature, etc.), the outside air temperature, the future driving information, or the coolant temperature of the engine 11. In such case, the requested energies (i.e., the requested electrical charge-discharge energy and the requested heat storage energy) may also be calculated according to a driver operation (e.g., a driver-desired temperature setting or the like) or according to environment information (e.g., outside air temperature or the like).

EXAMPLE 1

Figure 7:
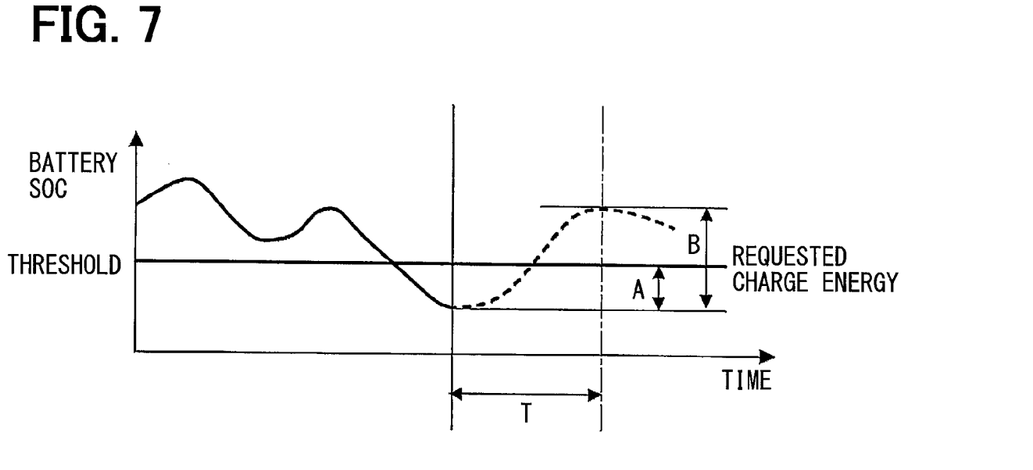
FIG. 7 is a diagram of how a requested charge energy is calculated.

When the battery SOC falls below a predetermined threshold, the engine 11 is forcefully operated for the charging of the electricity. In such case, the EV drive is made impossible, and thus it is desirable to have the battery SOC raised as high as possible relative to the threshold. Therefore, as shown in FIG. 7, when the battery SOC is lower than a predetermined threshold at some point in time, a requested charge energy B [J] is calculated by adding a certain margin to a charge energy A [J] that is at least required for increasing the battery SOC to the threshold in a predetermined time T. Then, by dividing this requested charge energy B with an electric power generation efficiency (i.e., an electric power generation efficiency based on the characteristic of the MG 12, the inverter 19, and the battery 18), a requested electric power generation energy that is required to fulfill the requested charge energy B is calculated.

EXAMPLE 2

Figure 8:
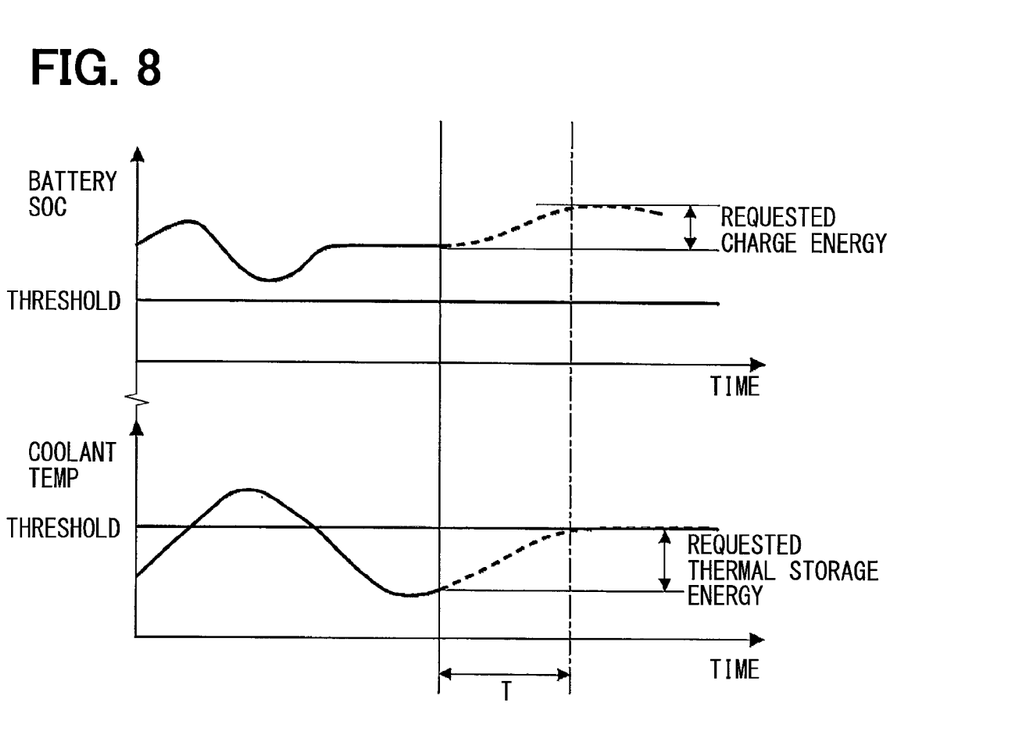
FIG. 8 is a diagram of how a requested heat storage energy and the requested charge energy are calculated.

As shown in FIG. 8, when the coolant temperature is lower than a predetermined threshold at a certain point in time, and the battery SOC is higher than another threshold, a requested heat storage energy required to raise the coolant temperature to the threshold in a predetermined time T is calculated. That is, the requested charge energy that is required to fulfill the requested heat storage energy is calculated first, and then, by dividing the requested charge energy by the electric power generation efficiency, a requested electric power generation energy that is required to fulfill the requested heat storage energy is calculated. Further, by dividing the requested heat storage energy by a heating efficiency (i.e., a heating efficiency may be defined from the characteristics of the engine 11 and the hot water circuit 23), a requested heating energy is calculated, and such requested heating energy may be used to correct the engine operation line.

Further, the calculation method of the requested energy is not limited to the above-mentioned methods in the example 1 and 2. That is, the requested energy calculation method may be changed or modified. For example, if it is expected that the energy regeneration is going to be caused while the vehicle descends a slope in an expected travel path in the near future based on the future driving information from a navigation device (e.g., a travel path, a travel distance, etc. in an expected travel in the near future), which enables a charging of the electric energy to the main battery 18 based on the conversion of the kinetic energy of the vehicle to the electric energy by the MG 12, a requested discharged energy may be calculated based on the relevant information, which includes the battery SOC, the expected amount of regeneration energy by the energy regeneration, etc.

Then, the routine proceeds to Step 105, and the target engine output is determined based on the requested drive power and the requested energy (i.e., the requested electrical charge-discharge energy and the requested heat storage energy) so that the target engine output fulfills the requested energy while keeping the system efficiency function within the predetermined range that includes the maximum value of the function.

Figure 9:
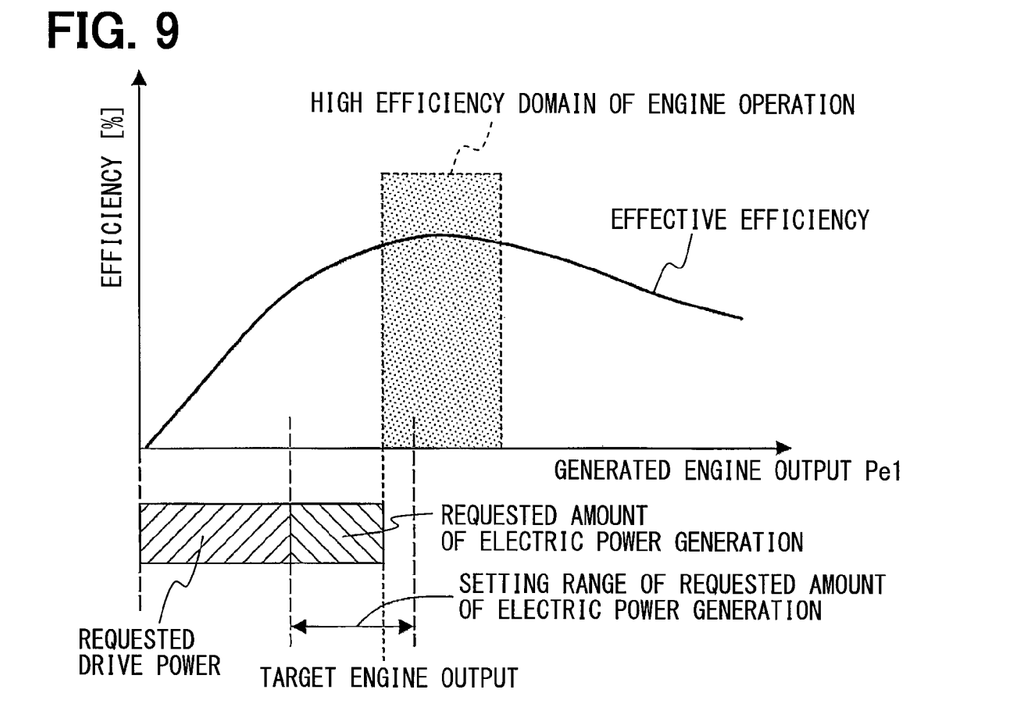
FIG. 9 is a diagram of how a target engine output is determined.

For example, as shown in FIG. 9, a setting range of a requested amount of electric power generation for achieving the requested electric power generation energy that is required for fulfilling the requested charge energy is calculated, and the target engine output (i.e., the requested drive power+the requested amount of electric power generation) is then calculated by adding the requested drive power to the requested amount of electric power generation so that the target engine output is put in the high efficiency domain of the engine operation even when the requested amount of electric power generation is kept in the above-described setting range. In such case, as long as a base condition is fulfilled, that is, if the target engine output is kept in the high efficiency domain of the engine operation, (A) the target engine output may be set to minimize the requested amount of electric power generation, or, (B) the target engine output may be set to maximize the requested amount of electric power generation. Further, the target engine output may also be set to achieve a medium value (i.e., a value between the maximum value and the minimum value) of the requested amount of electric power generation. When the target engine output cannot be set up to be within the high efficiency domain of the engine operation, the target engine output may be set to achieve the maximum effective efficiency (i.e., the value of the system efficiency function) within an allowable/usable value range of the target engine output.

Figure 10:
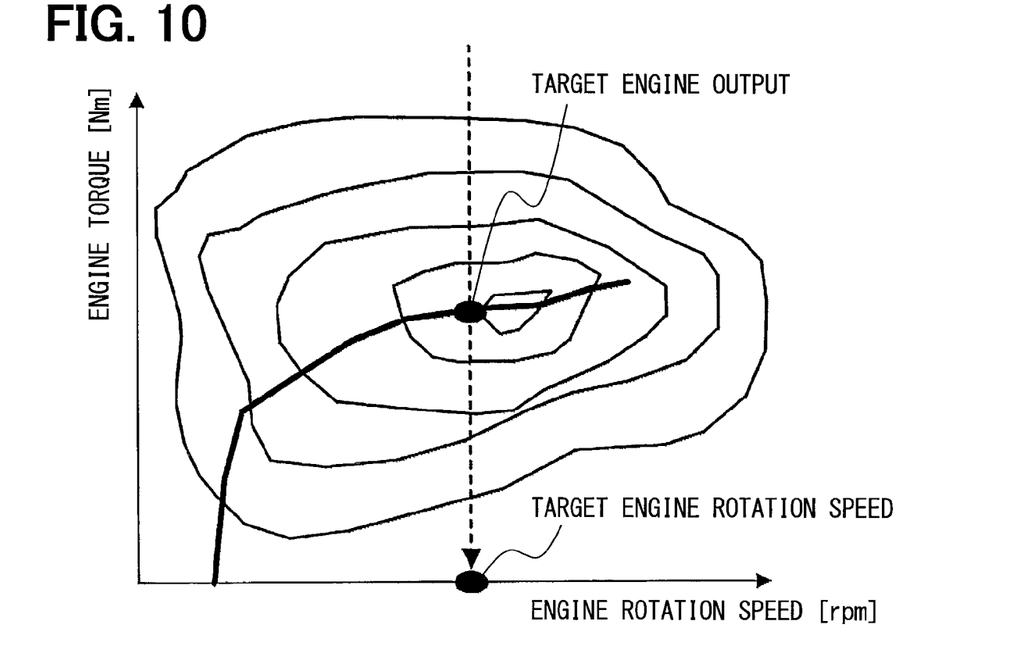
FIG. 10 is a diagram of how a target engine rotation speed is calculated.

Then, the routine proceeds to Step 106, and, as shown in FIG. 10, an engine rotation speed which fulfills the target engine output on the engine operation line is calculated as a target engine rotation speed.

In the example described above, the system efficiency function is defined by using the drive power of the vehicle, the generated electric power of the MG 12 and/or the generator 17, the discharged electric power of the main battery 18, the amount of heat for heating the coolant of the engine 11, and the amount of heat released from the coolant of the hot water circuit 23, and the target engine output is determined so the system efficiency function is kept in a range including the maximum value of the system efficiency function. Therefore, the engine is operated at or around an engine operation point where the efficiency of the whole system including the engine 11, the MG 12, the generator 17, and the main battery 18 etc. takes the maximum value or a near-maximum value. Thus, the efficiency of the whole system is improved and the fuel mileage is effectively improved.

Further, in addition to the drive power, the generated electric power, and the discharged electric power, the amount of heat for heating the coolant and the amount of heat released from the coolant are also used in the present embodiment, for defining the system efficiency function. Therefore, the fuel mileage at a time of warming up or heating can also be improved.

Even further, if an unnecessary energy (i.e., an electric power and/or heat) is generated, the improvement effect for improving the fuel mileage may decrease even when the engine 11 is operated to maximize the efficiency of the whole system.

In consideration of such a situation, the requested energies, such as the requested electrical charge-discharge energy and the requested heat storage energy and the like are calculated, based on at least one of the state of the main battery 18 (e.g., the battery SOC, the battery voltage, the battery temperature, etc.), the outside air temperature, the future driving information, or the coolant temperature of the engine 11, and the target engine output is determined so that the target engine output fulfills the requested energy while keeping the system efficiency function within the predetermined range that includes the maximum value of the system efficiency function. Therefore, the engine 11 is operated at the engine operation point where the system efficiency is raised as high as possible while generating the required energy (i.e., a required electric power and/or heat). Thus, the generation of the unnecessary energy is restricted thereby preventing the deterioration of the fuel mileage improvement effects.

In such case, even when the system encounters a situation in which a required charge or discharge capacity of the battery 18 is not available (i.e., when no sufficient vacant capacity for the required charge amount is found in the battery 18, or when no sufficient charged electricity is left in the battery 18 for the required discharge amount), the engine efficiency is still improved to some extent if the system efficiency is allowed to be just a little bit lower than the maximum efficiency. This is because the engine 11, which is designed to be used in a hybrid vehicle, has a very high efficiency and a change of the efficiency is very little at the maximum efficiency point and its proximity in general. In other words, by allowing a nominal decrease of the efficiency, the output of such engine may be decreased/increased by a certain magnitude (i.e., by a little bit greater magnitude). Such knowledge is utilized in the above control scheme.

Although, in the above embodiment, the target engine output is determined to control the system efficiency function to be kept within a certain range of the maximum value, how the target engine output is determined may be changed or modified. That is, for example, the system efficiency function may be maximized by the control of the target engine output. In such manner, the engine 11 is operated at the operation point where the efficiency of the whole system is maximized, thereby improving the fuel mileage more effectively. In such case, it is presumed that there is, in the battery 18, a sufficient vacant capacity for the required charging or a sufficient charge electricity available for the required discharging. Under such control scheme, since the required charge/discharge amount of electricity is determined as a certain value after determining that the engine 11 is operated at the operation point for the maximum system efficiency, whether the vacant capacity of the battery 18 or the dischargeable electricity in the battery 18 is sufficient or not is readily determined.

Further, the consideration of the amount of heat for heating the coolant and the amount of heat released from the coolant in addition to the drive power, the generated electric power, and the discharged electric power in the above-mentioned embodiment for defining the system efficiency function may be changed or modified. That is, the consideration of the amount of heating heat and/or released heat for heating/cooling of the coolant may be omitted from the system efficiency function. That is, the system efficiency function may be defined only based on the drive power, the generated electric power, and the discharged electric power.

Even further, the execution of the engine control routine by the hybrid ECU in the above-mentioned embodiment may be changed or modified. That is, the engine control routine may be executed in an ECU other than the hybrid ECU, or may even be executed by both of the hybrid ECU and other ECU(s).

In addition, a configuration of the hybrid vehicle to which the present disclosure is applied is not limited to the one illustrated in FIG. 1. That is, the present disclosure is applicable to the hybrid vehicle of having two or more motor generators, or even to a plug-in hybrid vehicle (PHV) whose battery is chargeable by an electric power source that is external to the hybrid vehicle.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A control apparatus of a hybrid vehicle having (i) an engine and a motor serving as a power source of the vehicle, (ii) a generator driven by the engine, and (iii) a battery that is charged and discharged, the control apparatus comprising:
a controller determining an engine output based on a system efficiency function that is defined by a drive power of the vehicle, a generated electric power from the generator, and a discharged electric power from the battery, wherein
the engine output determined by the controller controls the system efficiency function to have a maximum value or to stay within a preset value range that includes the maximum value.

2. The control apparatus of a hybrid vehicle of claim 1, wherein
the controller calculates a requested energy of charging and discharging based on at least one of a state of the battery, outside air temperature, or future driving information, and
the controller determines the engine output to fulfill the requested energy while keeping the system efficiency function within a preset value range.

3. The control apparatus of a hybrid vehicle of claim 1, wherein
the controller defines the system efficiency function by using an amount of heat for heating a coolant of the engine, an amount of heat released from the coolant in a hot water circuit, the drive power, the generated electric power, and the discharged electric power.

4. The control apparatus of a hybrid vehicle of claim 3, wherein
the controller calculates at least one of the requested energy of charging and discharging or a requested energy for heat storage, based on at least one of a state of the battery, outside air temperature, future driving information, or coolant temperature of the engine, and the controller determines the engine output to fulfill the requested energy while keeping the system efficiency function within a preset value range.

* * * * *